Patented Oct. 22, 1940

2,218,888

UNITED STATES PATENT OFFICE 2,218,888

HIGH RESISTANCE STEEL

Alessandro Marchetti, Sesto Calende, Italy

No Drawing. Application May 24, 1939, Serial No 275,541. In Italy July 9, 1938

2 Claims. (Cl. 75—126)

The present invention concerns a high resistance steel, which has, in the annealed condition, a minimum resistance of 90 kilos per square millimeter and an elastic limit of at least 80 kilos/sq. mm., which is unaffected by the rate of cooling following the arc-welding, and is not subject to changes in hardness in the transition zone.

It is possible for instance to build structures formed by welded tubes, without having to normalize or heat-treat same, after the welding is completed: the material maintaining, after the welding the minimum resistance of 90 kilos per sq. mm. Constructions built with this steel can be used for aircraft, in ships, in railways, motor-cars and the like.

In particular these constructions show no brittleness in the zone of transition from the weld to the full piece, and therefore it is impossible that fissures may originate in the metal.

This material can be used with advantage in making members or articles which have to undergo any hot working operation even when no welding is required.

Finally this method of construction may be applied in the production of any piece requiring a minimum resistance of 90 kilos/sq. mm., with the advantage of doing without any heat treatment and therefore avoiding the consequent mechanical tensions of tempering shrinkage.

The chemical composition characterizing the steel used in above constructions is the following:

Carbon up to 0.20% (preferably from 0.16 to 0.18%)
Manganese up to 1.8% (preferably from 1.2 to 1.5%)
Silicon up to 0.4% (preferably from 0.10 to 0.30%)
Chromium from 0.6 to 1%
Molybdenum from 0.3 to 1%
Vanadium from 0.3 to 0.8%.

Having now particularly described and ascertained the nature of my said invention and in what manner the same is to be performed, I declare that what I claim is:

1. A perfectly weldable steel alloy consisting of .16 to .18% carbon, 1.2 to 1.5% manganese, 0.10 to 0.30% silicon, .6 to 1% chromium, .3 to 1% molybdenum, .3 to .8% vanadium and the remainder substantially all iron.

2. A perfectly weldable steel alloy consisting of .18% carbon, 1.5% manganese, .3% silicon, 1% chromium, 1% molybdenum, .8% vandium and the remainder substantially all iron.

ALESSANDRO MARCHETTI.